United States Patent
Davidson

(10) Patent No.: US 7,054,071 B2
(45) Date of Patent: May 30, 2006

(54) MIREAU INTERFERENCE OBJECTIVE LENS

(75) Inventor: Mark P. Davidson, Palo Alto, CA (US)

(73) Assignee: Spectel Research Corporation, Palo Alto, CA (US)

( * ) Notice: Subject to any disclaimer, the term of this patent is extended or adjusted under 35 U.S.C. 154(b) by 29 days.

(21) Appl. No.: 10/886,817

(22) Filed: Jul. 8, 2004

(65) Prior Publication Data

US 2006/0007557 A1    Jan. 12, 2006

(51) Int. Cl.
*G02B 21/02* (2006.01)
(52) U.S. Cl. ........................ 359/656; 359/629
(58) Field of Classification Search ............... 359/661, 359/368
See application file for complete search history.

(56) References Cited

U.S. PATENT DOCUMENTS

| | | | | |
|---|---|---|---|---|
| 4,639,139 A | * | 1/1987 | Wyant et al. | 356/497 |
| 5,073,018 A | * | 12/1991 | Kino et al. | 359/368 |
| 5,166,751 A | * | 11/1992 | Massig | 356/495 |
| 5,270,860 A | * | 12/1993 | Suzuki | 359/660 |
| 6,721,094 B1 | * | 4/2004 | Sinclair et al. | 359/386 |
| 2005/0088663 A1 | * | 4/2005 | De Groot et al. | 356/497 |

FOREIGN PATENT DOCUMENTS

WO    WO 97/40422    * 10/1997

* cited by examiner

*Primary Examiner*—Jordan M. Schwartz
(74) *Attorney, Agent, or Firm*—Michael L. Sherrard

(57) ABSTRACT

A Mireau interference microscope is corrected for spherical and other aberrations induced by the beamsplitter and mirror support windows by incorporating a cover glass correcting-objective lens. The support windows for the beamsplitter and mirror have a combined thickness within the adjustment range of the cover glass correcting-objective lens.

2 Claims, 6 Drawing Sheets specimen is mounted on a moveable stage capable of vertical motion in the diagram

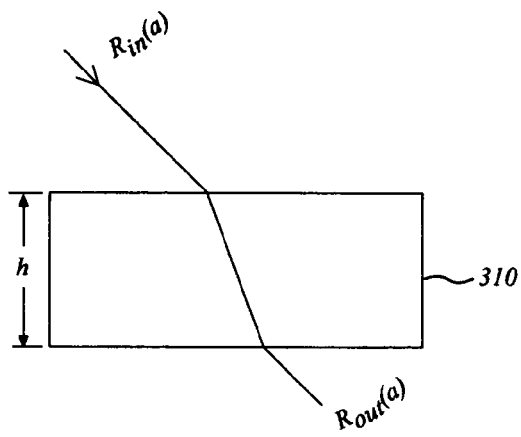
*Figure 6a*
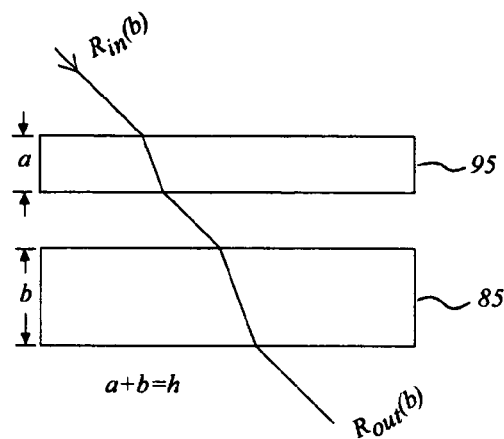
*Figure 6b*
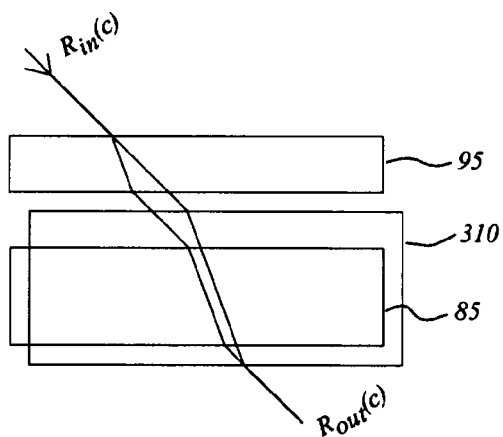
*Figure 6c*
*Figure 6*

MIREAU INTERFERENCE OBJECTIVE LENS

FIELD OF THE INVENTION

The present invention relates to field of interference microscopy. More particularly, the present invention teaches the use of a "cover glass correcting" objective lens in a Mireau (also spelled Mirau) interference microscope to provide aberration correction caused by the mirror and beamsplitter glass. The invention has particular applicability in surface metrology, inspection of microfabricated parts, and metrology of semiconductor wafers and masks.

BACKGROUND

Microscopes used in biological applications typically place a cover glass over a specimen to isolate the specimen from the atmosphere. Such cover glass typically has a thickness of approximately 0.17 mm. The high numerical aperture dry objective lenses typically used in biological microscopes may be designed to compensate for specified thicknesses of cover glass. However, if the thickness of the cover glass varies from the thickness specified in the lens design, fixed lenses are still susceptible to spherical and other aberrations which impair resolution and contrast.

In order to compensate for variations in cover glass thickness, several microscope vendors now produce cover glass correcting objective lenses for biological microscopes. These lenses allow adjustment for variations in cover glass thickness to ensure the optimum objective performance. For example, Nikon Instruments Inc. manufactures the "CFI Plan Apochromat 40×C," which has a numerical aperture of 0.95 and corrects for cover glass thicknesses from 0.11 millimeters to 0.23 millimeters.

Mireau interference microscopes, which have applications in surface metrology, inspection of microfabricated parts, and metrology of semiconductor wafers and masks, typically are not used with a cover glass. However, they do include thicknesses of glass used to support the beam splitter and mirror. If the combined glass thickness is more than about 1000 Angstroms, spherical aberration are introduced into the microscope image. For small numerical apertures this effect is small. However, the effect increases for larger numerical apertures, and is significant for numerical apertures greater than 0.7.

An example of the background and prior art includes:

| U.S. Pat. No. 5,073,018 | December, 1991 | Kino et al. | 359/368 |
|---|---|---|---|

The Kino et al patent teaches a Mireau interference microscope having a very thin beamsplitter (less than 1000 Angstroms) in the high numerical part of the beam of an objective lens. Kino et al also teaches a method of making such the thin beamsplitter.

A general reference on Interference microscopy is: Harihan, P., *Optical Interferometry Second Edition*, Academic Press, Amsterdam, Second edition, 2003.

However, it is difficult to fabricate support glass for the beamsplitter and mirror whose thickness is less than 1000 Angstroms and such thin parts are also excessively fragile.

It is desirable to provide a Mireau interference microscope having support glass structures for the beam splitter and mirror which have a combined thickness of approximately 200 microns and to correct for the resulting aberrations.

SUMMARY OF THE INVENTION

The preferred embodiment of the present invention is a Mireau interference microscope corrected for the aberrations resulting from the combined thicknesses of the glass used to support the mirror and the glass used to support the beamsplitter. This is accomplished by incorporating a cover glass correcting objective lens in a Mireau interference microscope and using support glasses for the beam splitter and mirror which have a combined thickness of glass within the range of correction of the correcting-objective lens. This results in a cost effective Mireau interference microscope compensated for the aberrations caused by the beamsplitter and mirror support glass.

BRIEF DESCRIPTION OF THE FIGURES

FIGS. 6a, 6b and 6c illustrate a ray-tracing analysis showing the optical equivalence of two separated glass supports and a cover glass having equal combined thicknesses.

DETAILED DESCRIPTION OF THE INVENTION

Figure 1:
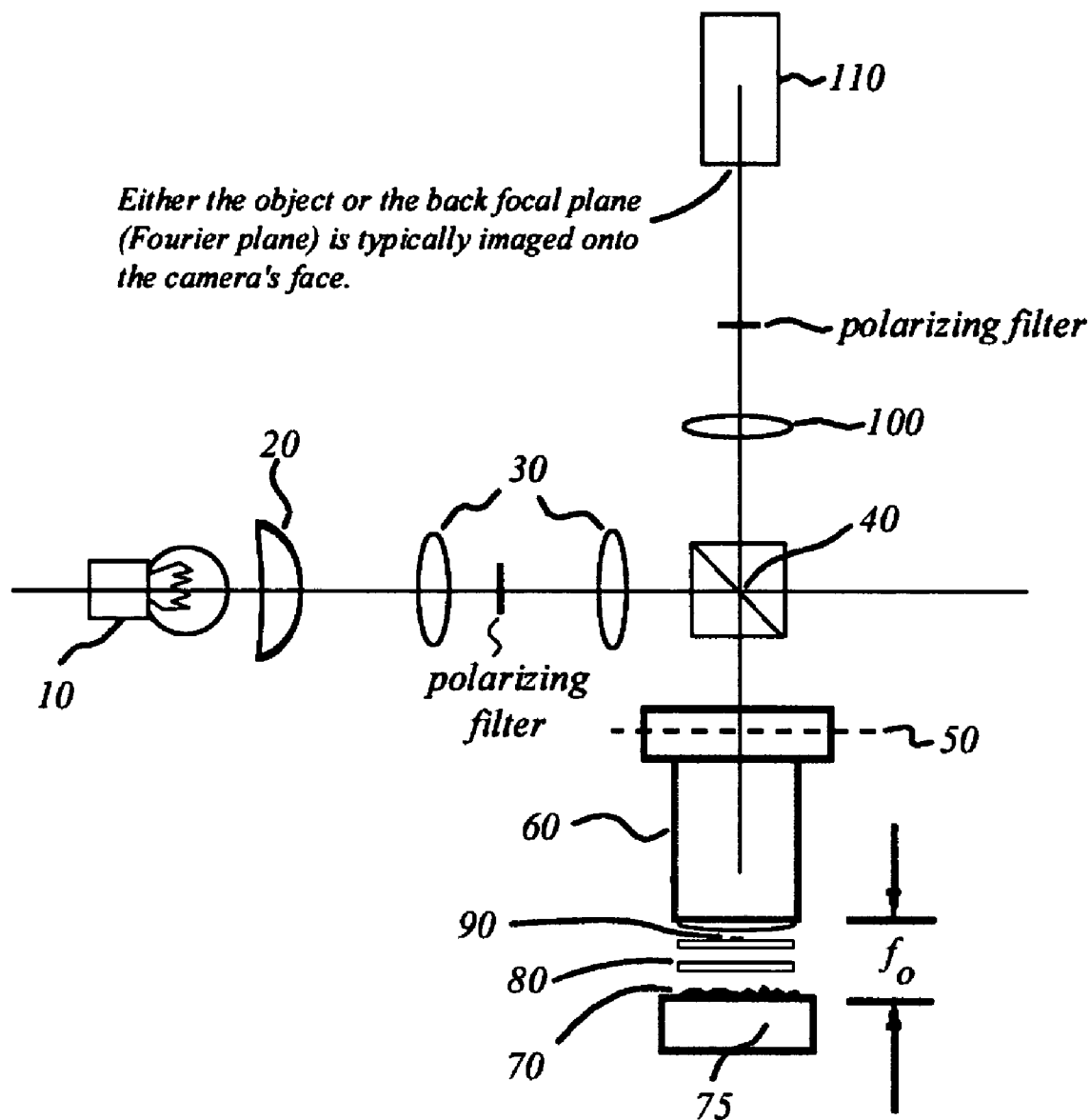
FIG. 1 is an illustration of a Mireau interference microscope adapted in accordance with one embodiment of the present invention.

FIG. 1 is an illustration of a Mireau interference microscope adapted in accordance the present invention. A light source 10 provides broadband illumination for the microscope. Light source 10 may be a highly incoherent luminous source such as an arc lamp or a tungsten halogen lamp. Light source 10 is directed to and imaged on back focal plane 50 of microscope objective lens 60 by condenser lens 20, lenses 30, and beamsplitter 40.

Figure 2:
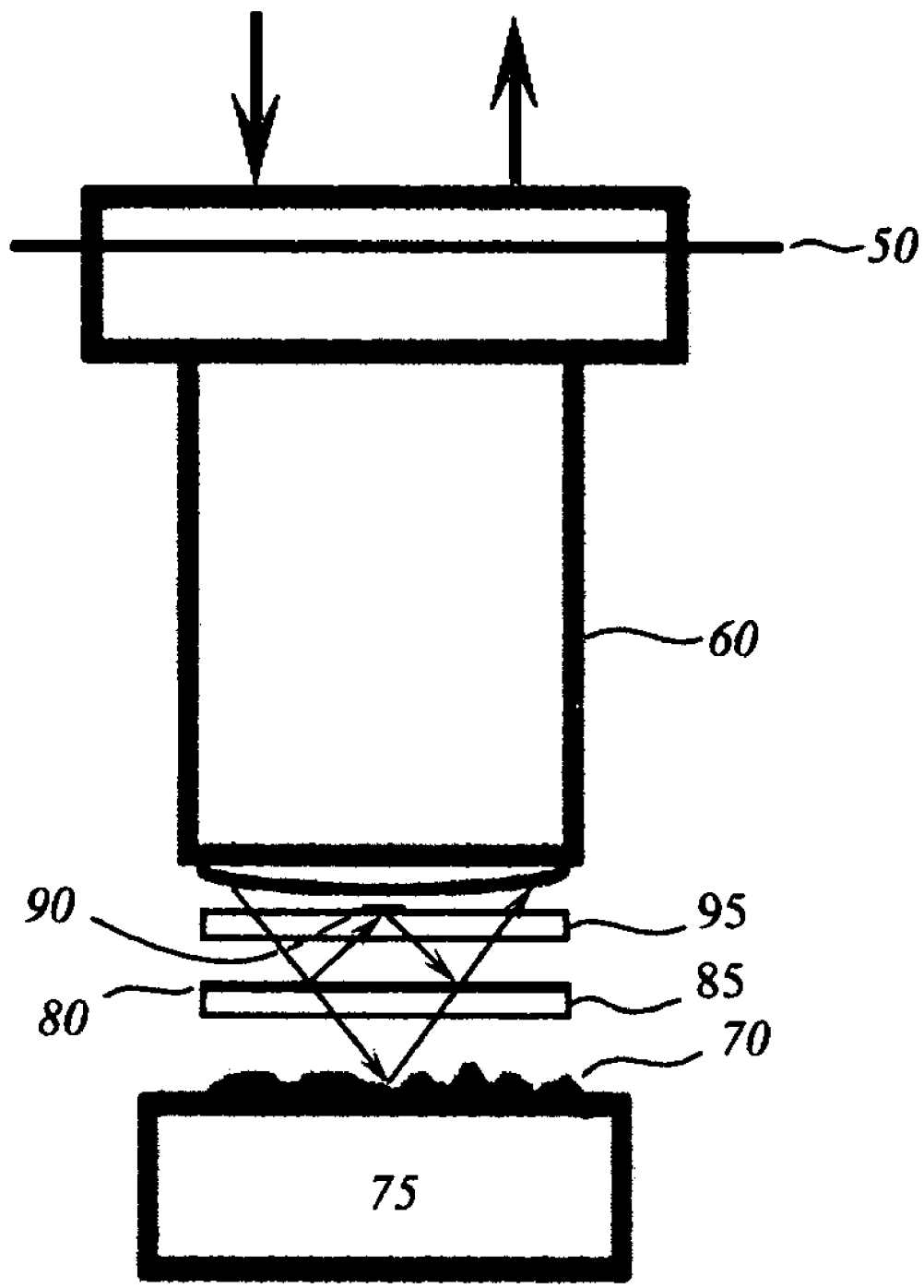
FIG. 2 is a more detailed illustration of the optical reference and object paths of the Mireau interference microscope shown in FIG. 1.

The optical reference path of the Mireau interference microscope of FIG. 1 is illustrated in more detail in FIG. 2. The reference illumination passes through cover glass correcting-objective 60, passes through mirror support glass 95, is reflected from beamsplitter 80, passes through mirror support glass 95 again, reflects from mirror 90, passes through mirror support glass 95 a third time, reflects again from beamsplitter 80, passes through mirror support glass 95 a fourth time, and then reenters cover glass correcting-objective 60.

The optical object path of the Mireau interference microscope of FIG. 1 is also illustrated in detail in FIG. 2. The object illumination passes through cover glass correcting-objective 60, passes through mirror support glass 95, through beamsplitter 80 and beamsplitter support glass 85, is reflected from the specimen 70, passes through beamsplitter support glass 85 and mirror support glass 95, and then reenters cover glass correcting objective 60.

As is typical in interference microscopes, the path-length difference between the object and reference paths is variable. In the present embodiment, specimen 70 (or "object") is mounted on a vertically moveable stage 75 that allows variation in the object path length.

Mirror support glass 95 must have a thicknesses adequate to support itself and mirror 90. Similarly, beamsplitter support glass 85 must have a thickness adequate to support itself and beamsplitter 80. However, such windows in front of an objective lens introduce spherical aberration. In the prior art (Kino et al., U.S. Pat. No. 5,073,018), this problem was overcome by restricting the thickness of the window to 1000 Angstroms or smaller. With such thin glass supports the spherical aberration introduced is negligible. However, making such a thin glass supports is difficult, adds cost to the system, and such thin glass support is quite fragile. It is desirable to be able to use substantially thicker windows in a Mireau interference microscope.

Figure 3:
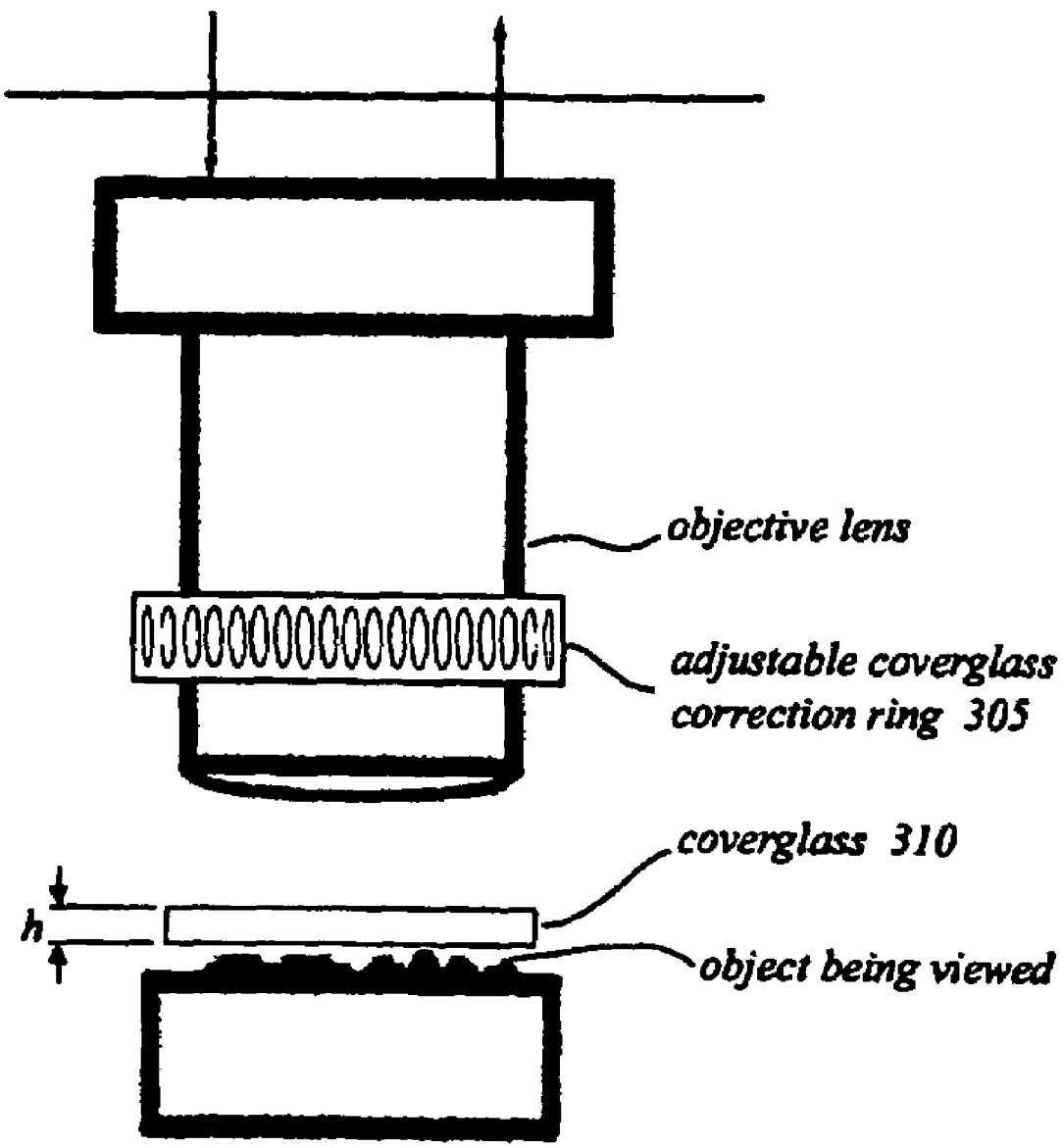
FIG. 3 illustrates a typical biological microscope with a correcting-objective lens having a correction ring for correction of varying cover glass thickness.

Cover glass correction of commercial lenses typically used in biological microscopes can handle a range of cover glass thickness from about 11 mm to about 0.23 mm. FIG. 3 shows a cover glass correcting-objective lens which has a corrector adjustment ring 305 for correcting for different thicknesses of cover glass 310. Such lenses are typically used in biology where the specimen is under the cover glass to isolate the specimen from the environment.

Figure 4:
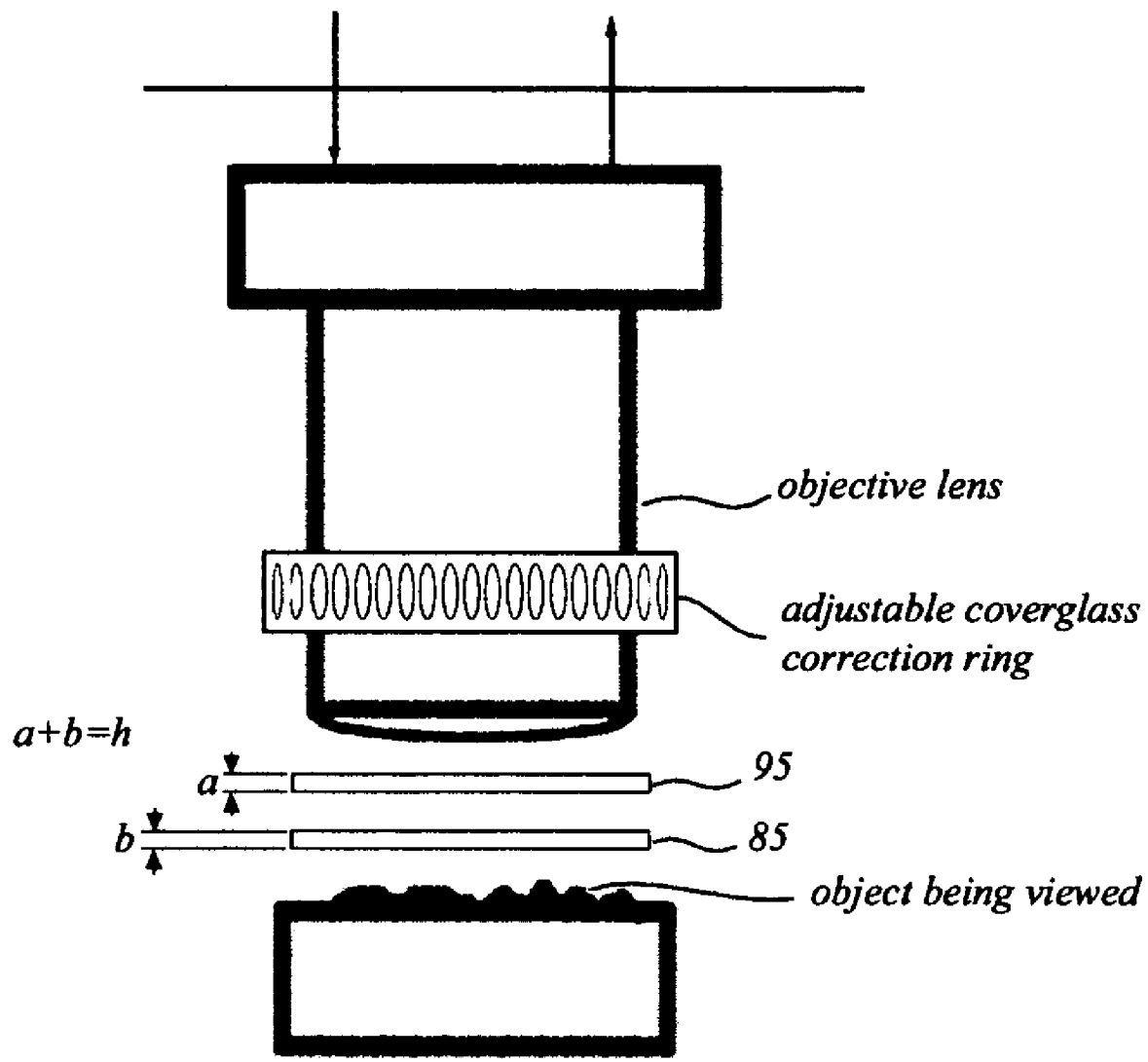
FIG. 4 illustrates the use of two parallel glass supports whose combined thickness equals that of the cover glass illustrated in FIG. 3.

FIG. 4 shows the cover glass replaced by the combination of mirror support glass 95 and beamsplitter support glass 85. The index of refractions of the support glasses 85 and 95 are the same as the index of refraction of cover glass 310 and the combined thickness of support glass 95 and support glass 85 is equal to the thickness of cover glass 310.

Figure 5:
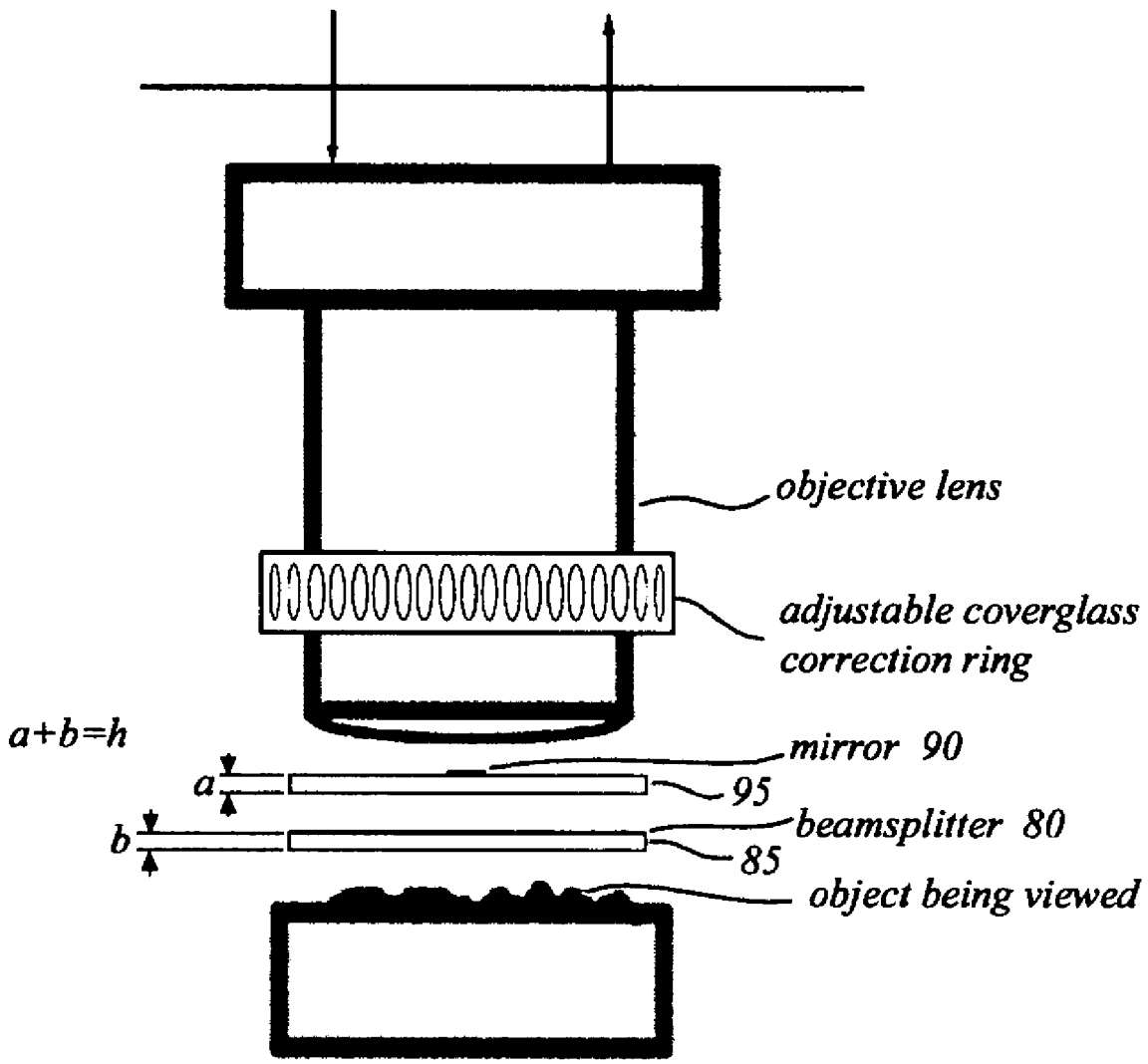
FIG. 5 illustrates the two glass supports of FIG. 4 modified to provide the beamsplitter and mirror integral to a Mireau interference microscope.

FIG. 5 shows a mirror 90 patterned onto support glass 95 and a beamsplitter 80 coated onto support glass 85 as would be typical of a Mireau interference microscope.

FIG. 6 illustrates a ray tracing analysis which proves that the image will be the same (ignoring extra reflections from the two windows) for the two glass support system of FIG. 4 as for the cover glass system of FIG. 3. Specifically, in FIG. 6a, a ray "$R_{in}(a)$" is shown entering a thickness "h" of cover glass 310 as in the system illustrated in FIG. 3. This ray is refracted at the air-glass interfaces and exits as ray "$R_{out}(a)$." FIG. 6b illustrates the same ray $R_{in}(b)$ passing through mirror support glass 95 and beam support glass 85, wherein the combined thickness of the two support glasses equals the thickness of cover glass 310 and the three glasses have the same index of refraction. As illustrated the incoming rays in FIGS. 6a and 6b, rays $R_{in}(a)$ and $R_{in}(b)$ are identical. As illustrated in the ray tracing analysis, the outgoing rays, $R_{out}(a)$ and $R_{out}(b)$ are also identical.

FIG. 6c shows the equivalence of the systems of FIGS. 6a and 6b by superimposing the two systems. As can be seen, the effect of the two systems is identical provided that the combined thickness of the two support glasses 85 and 95 is equal to the thickness of cover glass 310 and the indexes of the refraction for the three glasses are the same.

Therefore, if objective lens 60 is corrected for the thickness of cover glass 310, it will also be corrected for the equivalent Mireau-compatible support glass system illustrated in FIG. 6b. It is clear from FIGS. 6a–6c that the equivalence of the two support glass system to the single cover glass is true regardless of angle of incidence, wavelength, or polarization of the incoming ray. Therefore, a high numerical aperture Mireau system can be made from commercially available cover glass correcting-objective lenses and using support glass having a combined total thickness within the correction limits of the cover glass correcting-objective lens.

Further, the present invention also contemplates other multiple-support glass structures provided that all air-glass interfaces are all parallel to one another, perpendicular to centerline of the objective, and the combined thickness of the support glass is within the compensation range of the correcting-objective lens. Further still, plastics and other materials could be substituted for glass. In such as case, the difference in index of refraction could be compensated for by slightly different material thicknesses. That is, it is contemplated that the compensation will be advantageous within a range of indexes and thicknesses.

What is claimed is:

1. A Mireau interference microscope comprising:
    a microscope objective lens which has manually adjustable aberration correction;
    two parallel windows, spaced apart, placed in the optical path between the objective lens and an object location, both windows having surfaces perpendicular to the optical axis;
    a beamsplitter surface on the window closest to the object location; and
    a mirror surface on the window closest to the objective lens, said manually adjustable aberration correction providing correction for aberrations due to the thicknesses of the two parallel windows.

2. A Mireau interference microscope as in claim 1 wherein the mirror surface on the window closest to the objective lens is partially reflective and covers an entire surface of the window.

* * * * *